United States Patent Office 3,392,190
Patented July 9, 1968

3,392,190
HALOGENATED BICYCLIC KETO ACID-ESTERS
Israel J. Dissen, Chicago, Ill., assignor to Velsicol Chemical Corporation, Chicago, Ill., a corporation of Illinois
No Drawing. Filed July 13, 1964, Ser. No. 382,367
7 Claims. (Cl. 260—483)

ABSTRACT OF THE DISCLOSURE

A compound of the formula

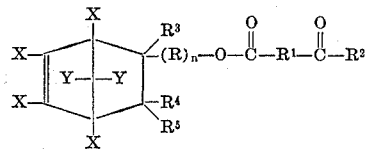

wherein X is selected from the group consisting of chlorine, bromine and fluorine; Y is selected from the group consisting of hydrogen, chlorine, bromine and fluorine; $n$ is an integer from 0 to 1; R and $R^1$ are alkylene groups containing from one to ten carbon atoms; $R^2$ is an alkyl group containing from one to ten carbon atoms; $R^3$ and $R^4$ are independently selected from the group consisting of hydrogen and an alkyl group containing from one to ten carbon atoms; and $R^5$ is independently selected from the group consisting of hydrogen, an alkyl group containing from one to ten carbon atoms and

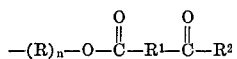

wherein R, $R^1$, $R^2$ and $n$ are as described above.

---

This invention relates to new compositions of matter. More particularly, the present invention relates to new prepare new compositions of matter useful in the production of products of vinyl resins.

The compounds of the present invention have the structure:

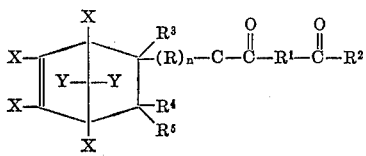

wherein X is selected from the group consisting of chlorine, bromine and fluorine; Y is selected from the group consisting of hydrogen, chlorine, bromine and fluorine; $n$ is an integer from 0 to 1; R and $R^1$ are alkylene groups containing from one to ten carbon atoms; $R^2$ is an alkyl group containing from one to ten carbon atoms; $R^3$ and $R^4$ are independently selected from the group consisting of hydrogen and an alkyl group containing from one to ten carbon atoms; and $R^5$ is independently selected from the group consisting of hydrogen, an alkyl group containing from one to ten carbon atoms and

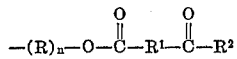

wherein R, $R^1$, $R^2$, and $n$ are as defined above.

The compositions of the present invention are useful as plasticizers, particularly for vinyl resins. These new compositions when used as plasticizers, impart flame and fire retardance to the final resin composition or end product.

Therefore, it is one object of the present invention to prepare new compositions of matter useful in the production of products of vinyl resins.

Another object of the present invention is the preparation of new halogenated compositions of matter.

Another object of this invention is to provide plasticizers for vinyl resins.

Still another object of this invention is to provide plasticizers for vinyl resins which impart flame and fire retardance to the resin composition.

These and other objects and advantages of the present invention will become apparent from the ensuing description.

The compositions of the present invention are remarkably effective as plasticizers when mixed with thermoplastic resins, such as polyvinyl chloride, chlorinated polyethylene, polyvinyl acetate, vinyl chloride-vinylidene chloride copolymers, and the like. This effectiveness is believed to be due at least in part to the presence of the keto group on the acid portion of the esters of the present invention. The compositions of the present invention can be added in an amount ranging between 10–120% by weight based on the weight of the resin.

The compounds of the present invention can be readily prepared from an aliphatic keto-acid and a polyhalogenated norbornene alcohol. The two ingredients are esterified to form the compounds of the present invention. The esterification is preferably performed in the presence of an esterification catalyst, and most preferably in the presence of acid catalysts such as para-toluene sulfonic acid, sulfuric acid, hydrochloric acid, boron-trifluoride, aluminum trichloride and the like. Although the esterification will take place in the absence of the catalyst, the rate is slow, and hence the use of catalyst is preferred. Only catalytic amounts of catalyst such as from 0.005% to about 5% by weight of the reactants, are required to accelerate the reaction. The esterification proceeds with the formation of water. It is preferred to remove the water as it is formed by suitable means, such as by azeotroping a mixture of the water with an organic substance in which the water is relatively immiscible. For this purpose it is preferred to employ a suitable quantity of an organic liquid, such as toluene, xylene, benzene, heptane, and the like, and perform the esterification at reflux so as to remove the water as it is formed.

Aliphatic keto-acids which can be utilized in the preparation of the compounds of the present invention are exemplified by: levulinic acid, 4-ketohexanoic acid, acetoacetic acid, pyruvic acid, β-methyllevulinic acid, α-methyllevulinic acid, 4-ketoheptanoic acid, 4-ketooctanoic acid, 4-ketononoic acid, 4-ketodecanoic acid, mesitonic acid, β,β-dimethyllevulinic acid, and the like.

Suitable norbornene alcohols, which can be employed in the manner described above, can be readily prepared by reacting a polyhalogenated cyclopentadiene with an unsaturated alcohol in a Diels-Alder adduction, as described by E. K. Fields, J.A.C.S., 76, p. 2709 (1954) and Geering et al., U.S. Patent 2,983,732. Suitable halogenated cyclopentadiene ingredients are:

hexachlorocyclopentadiene,
pentachlorocyclopentadiene,
tetrachlorocyclopentadiene,
hexabromocyclopentadiene,
pentabromocyclopentadiene,
tetrabromocyclopentadiene,
hexafluorocyclopentadiene,
5,5-difluorotetrachlorocyclopentadiene, and the like. Exemplary of the suitable unsaturated alcohols which can be adducted with the polyhalogenated cyclopentadienes to yield the norbornene alcohols are: allyl alcohol, crotyl alcohol, methylvinylcarbinol, allylcarbinol, methylpropenyl carbinol, 3-butenol, 3-pentenol- 2, 4-pentenol, undecylene alcohol, 2-butenediol-1,4, 3-hexenediol-2,5-dimethyl-3-hexenediol-2,5, and the like.

Alternatively, the compounds of the present invention can be readily prepared by first esterifying the aliphatic keto-acid with the unsaturated alcohol, and then adducting the resulting unsaturated ester or diester with the appropriate halogenated cyclopentadiene. As in the first method, the esterification is preferably performed in the presence of an esterification catalyst, most preferably an acid catalyst, such as those heretofore described. An organic liquid is also preferably employed to aid in removing water formed during the esterification reaction. The adduction reaction can be performed by heating the halogenated cyclopentadiene with the unsaturated ester or diester in the manner described for the preparation of the norbornene alcohol in the preceding paragraph.

The following examples are set forth to illustrate, but not limit the preparation of the compounds of the present invention, and in each example there can be substituted therein other reactants within the previously described scope of the invention.

EXAMPLE 1

Preparation of 1,2,3,4,7,7-hexachloro-2-bornen-5-yl-methyl levulinate

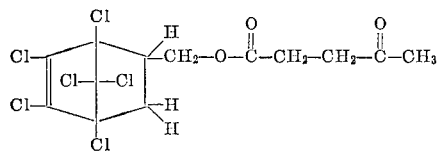

1,2,3,4,7,7-hexachloro - 5-hydroxymethyl-2-norbornene (110 g.; 0.33 mol), which can be prepared from hexachlorocyclopentadiene and allyl alcohol as described by E. K. Fields, J.A.C.S., 76, p. 2709 (1954), levulinic acid (40 g.; 0.33 mol), para-toluene sulfonic acid (1.2 g.) and toluene (100 ml.) were placed into a 300 ml., three-necked, round-bottom flask equipped with a mechanical stirrer, thermometer, and condenser and Dean-Stark tube. The contents of the flask were heated to reflux and maintained at reflux for 5 hours. The heating was stopped and upon cooling the reaction mixture was washed in a separatory funnel with diethyl ether, then washed with water and then with aqueous sodium bicarbonate solution, and dried over anhydrous sodium sulfate. The solution was filtered and the toluene distilled off in vacuo. The residue was washed into a distillation apparatus with diethyl ester and the ether removed by distillation in vacuo. The residue was distilled in vacuo and the fraction distilling at 177.5–178° C. at 0.55 mm. mercury pressure was collected as the product 1,2,3,4,7,7-hexachloro-2-norbornen-5-yl-methyl levulinate. The product had a refractive index at 26.0° C. of 1.5315 and the following elemental analysis:

Calculated for $C_{13}H_{12}Cl_6O_3$: Theoretical percent: C, 36.40; H, 2.82; Cl, 49.59. Found percent: C, 36.02; H, 2.80; Cl, 49.61.

EXAMPLE 2

Preparation of 1,2,3,4,7,7-hexachloro-2-norbornen-5,6-yl bis(methyl levulinate)

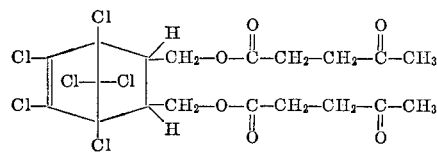

1,2,3,4,7,7-hexachloro - 5,6-bis(hydroxymethyl)-2-norbornene (119 g.; 0.33 mol), which can be prepared from hexachlorocyclopentadiene and 2-butenediol-1,4 as described by Geering et al., U.S. Patent 2,983,732, levulinic acid (80 g.; 0.66 mol), para-toluene sulfonic acid (2.4 g.) and toluene (150 ml.) are placed into the apparatus described in the previous example. The contents of the flask are heated to reflux and maintained at reflux for several hours until water is no longer collected in the Dean-Stark trap. Upon cooling, the reaction mixture is washed successively with diethyl ether, water and aqueous sodium bicarbonate solution, and dried over anhydrous sodium sulfate. The resulting solution is filtered and the toluene distilled off in vacuo to yield 1,2,3,4,7,7-hexachloro-2-norbornen-2,6-yl bis(methyl levulinate).

EXAMPLE 3

Preparation of 1,2,3,4,7,7-hexachloro-2-norbornen-5,6-yl bis(methyl levulinate)

Levulinic acid (116.1 g.; 1.0 mol), toluene (100 ml.) and para-toluene sulfonic acid (1.5 g.) were placed into a 300 ml., three-necked, round-bottom flask equipped with a mechanical stirrer, thermometer, dropping funnel, and condenser and Dean-Stark tube. The contents of the flask were heated to reflux. 2-butenediol-1,4 (22 g.; 0.25 mol) was added dropwise to the flask. The mixture was maintained at reflux until water ceased to be collected in the Dean-Stark tube. A total of 9 ml. of water was collected. The toluene was removed from the reaction mixture by distilling in vacuo. Unreacted levulinic acid was removed as a distillate fraction distilling at 115–117° C. at 1 mm. mercury pressure. The residue was dissolved in methylene chloride and washed with water, aqueous sodium carbonate solution and again with water, and dried over anhydrous sodium sulfate. The methylene chloride was distilled in vacuo yielding the desired intermediate as the residue.

A portion of the intermediate (32 g.; 0.11 mol) was added dropwise to a flask containing hexachlorocyclopentadiene (30 g.; 0.11 mol) and epichlorohydrin (1 ml.), which had been heated to 110° C. The temperature of the reaction mixture was raised to 150° C. and maintained at 150–160° C. for about 3 hours. Upon cooling the product 1,2,3,4,7,7-hexachloro-2-norbornen-5,6-yl bis(methyl levulinate), was recovered as a viscous residue which was insoluble in pentane and hexane, but soluble in acetone.

EXAMPLE 4

Preparation of 1,2,3,4,7,7-hexabromo-2-norbornen-5-yl-methyl levulinate 1,2,3,4,7,7 - hexabromo - 5 - hydroxymethyl - 2 - norbornene (199 g.; 0.33 mol), which can be prepared in the same manner as described for the hexachloro alcohol ingredient in Example 1, levulinic acid (40 g.; 0.33 mol), para-toluene sulfonic acid (1.2 g.) and toluene (100 ml.) are placed into the apparatus described in Example 1. The contents of the flask are heated at reflux for several hours until water is no longer collected in the Dean-Stark tube. The product is isolated and purified in the manner described in Example 1 to yield 1,2,3,4,7,7-hexabromo-2-norbornen-5-yl-methyl levulinate.

The procedure detailed in the above examples can be utilized to prepare other compounds within the scope of the invention. Given in the examples below are the necessary reactants from which the named compounds of the present invention can be prepared. The first reactant is the diene which is reacted with the unsaturated alcohol reactant yielding the intermediate norbornene alcohol which is reacted with the third reactant, the keto acid, to form the named compound.

EXAMPLE 5

Tetrachlorocyclopentadiene is reacted with allyl alcohol to form 1,2,3,4 - tetrachloro-5-hydroxymethyl-2-norbornene, which is reacted with levulinic acid to yield 1,2,3,4-tetrachloro-2-norbornen-5-yl-methyl levulinate.

EXAMPLE 6

Pentachlorocyclopentadiene is reacted with crotyl alcohol to form 1,2,3,4,7 - pentachloro - 5 - hydroxymethyl-6-methyl-2-norbornene, which is reacted with levulinic acid to yield 1,2,3,4,7-pentachloro-6-methyl-2-bornen-5-yl-methyl levulinate.

EXAMPLE 7

Hexachlorocyclopentadiene is reacted with undecylene alcohol to form 1,2,3,4,7,7 - hexachloro - 5 - (9 - hydroxynonyl)-2-norbornene, which is reacted with 4-ketohexanoic acid to yield 1,2,3,4,7,7-hexachloro-2-norbornen-5-yl-nonyl 4-ketohexanoate.

EXAMPLE 8

Hexabromocyclopentadiene is reacted with 3-butenol to form 1,2,3,4,7,7 - hexabromo - 5 - (β-hydroxyethyl)-2-norbornene, which is reacted with acetacetic acid to yield β - (1,2,3,4,7,7 - hexabromo-2-norbornen-5-yl)ethyl acetoacetate.

EXAMPLE 9

Tetrachlorocyclopentadiene is reacted with 3-pentenol-2 to form 1,2,3,4-tetrachloro-5-(α-hydroxyethyl)-3-methyl-2-norbornene, which is reacted with 4-ketooctanoic acid to yield α-(1,2,3,4-tetrachloro-6-methyl-2-norbornen-5-yl) ethyl 4-ketooctanoate.

EXAMPLE 10

Tetrabromocyclopentadiene is reacted with 4-pentenol to form 1,2,3,4 - tetrabromo-5-(γ-hydroxypropyl)-2-norbornene, which is reacted with pyruvic acid to yield γ-(1,2,3,4-tetrabromo-2-norbornen-5-yl)-propyl pyruvate.

EXAMPLE 11

Hexabromocyclopentadiene is reacted with 2-butenediol-1,4 to form 1,2,3,4,7,7-hexabromo-5,6-bis(hydroxymethyl)-2-norbornene, which is reacted with levulinic acid to yield 1,2,3,4,7,7-hexabromo-2-norbornen-5,6-yl bis (methyl levulinate).

EXAMPLE 12

Hexachlorocyclopentadiene is reacted with 2,5-dimethyl-3-hexenediol-2,5 to form 1,2,3,4,7,7-hexabromo-5,6-bis (α-hydroxyisopropyl)-2-norbornene which is reacted with levulinic acid to yield α,α-(1,2,3,4,7,7-hexachloro-2-norbornen-5,6-yl)-bis(isopropyl levulinate).

EXAMPLE 13

Pentachlorocyclopentadiene is reacted with 2-butenediol-1,4 to form 1,2,3,4,7-pentachloro-5,6-bis(hydroxymethyl)-2-norbornene, which is reacted with levulinic acid to yield 1,2,3,4,7 - pentachloro - 2 - norbornen - 5,6 - yl bis (methyl levulinate).

EXAMPLE 14

Tetrachlorocyclopentadiene is reacted with 2-butenediol-1,4 to form 1,2,3,4-tetrachloro-5,6-bis(hydroxymethyl)-2-norbornene, which is reacted with acetacetic acid to yield 1,2,3,4-tetrachloro-2-norbornen-5,6-yl bis(methyl acetoacetate).

EXAMPLE 15

Hexachlorocyclopentadiene is reacted with 3-hexenediol-2,5 to form 1,2,3,4,7,7-hexachloro-5,6-bis(α-hydroxyethyl)-2-norbornene, which is reacted with levulinic acid to yield α,α-(1,2,3,4,7,7-hexachloro-2-norbornen-5,6-yl bis (ethyl levulinate).

EXAMPLE 16

Hexabromocyclopentadiene is reacted with 2-butenediol-1,4 to form 1,2,3,4,7,7-hexabromo-5,6-bis(hydroxymethyl)-2-norbornene, which is reacted with levulinic acid to yield 1,2,3,4,7,7-hexabromo-2-norbornen-5,6-yl bis-(methyl levulinate).

EXAMPLE 17

Hexachlorocyclopentadiene is reacted with 2-butenediol-1,4 to form 1,2,3,4,7,7-hexachloro-5,6-bis(hydroxymethyl)-2-norbornene, which is reacted with 4-ketohexanoic acid to yield 1,2,3,4,7,7-hexachloro-2-norbornen-5,6-yl bis(methyl 4-ketohexanoate).

Additional compounds within the scope of the present invention are: 1,2,3,4,7,7-hexachloro-2-norbornen-5-yl-methyl acetoacetate and 1,2,3,4,7,7-methyl acetoacetate and 1,2,3,4,7,7 - hexachloro-2-norbornen-5-yl-methyl-4-ketohexanoate.

The following example illustrates the effectiveness of the compounds of the present invention as a plasticizer for vinyl resins. The plasticized resin thus obtained possesses flame retardant properties due to the compounds of this invention. Although a specific compound of the present invention is utilized in Example 18, other compounds within the scope of the present invention can be successfully substituted therefor.

EXAMPLE 18

Use of the compounds of the present invention as a plasticizer

Polyvinyl chloride resin "Marvinol VR–23" marketed by the U.S. Rubber Company (100 parts), product of Example 1 (50 parts) and a barium-cadmium stabilizer (2.5 parts) were roll milled at 300° F. and pressed into a sheet at 350° F. The sheet had the following properties:

| | |
|---|---|
| 100% modulus _____p.s.i__ | 3438 |
| Tensile strength _____ | 3438 |
| Elongation _____percent__ | 194 |
| Hardness (Shore A) _____ | 96 |
| Heat stability at 375° F. _____min__ | 14 |
| Asphalt strain index _____ | 8.5 |
| Soapy water extraction _____percent__ | 0.95 |
| Heptane extraction _____do____ | 1.75 |
| Carbon volatility _____do____ | 1.27 |

The above properties demonstrate that the plasticized resin is satisfactory as to solvent and soapy water extraction, volatility, heat stability and resistance to asphalt migration. Moreover, in a separate test the product of Example 1 was found to be completely compatible in the above system at 70 parts of compound per hundred parts of vinyl resin.

Thus it will be readily seen by those skilled in the art that the compounds of present invention are effective as plasticizers for vinyl resins which can be used in a multitude of vinyl resin applications.

I claim:
1. A compound of the formula

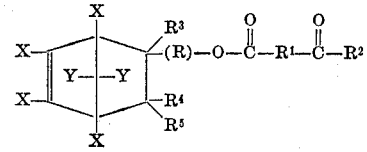

wherein X is selected from the group consisting of chlorine, bromine and fluorine; Y is selected from the group consisting of hydrogen, chlorine, bromine and fluorine; R and $R^1$ are alkylene groups containing from one to ten carbon atoms; $R^2$ is an alkyl group containing from one to ten carbon atoms; $R^3$ and $R^4$ are independently selected from the group consisting of hydrogen and an alkyl group containing from one to ten carbon atoms; and $R^5$ is selected from the group consisting of hydrogen, an alkyl group containing from one to ten carbon atoms and

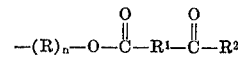

wherein R, $R^1$, $R^2$ and $n$ are as described above.

2. 1,2,3,4,7,7 - hexachloro - 2 - norbornen-5-yl-methyl levulinate.

3. 1,2,3,4,7,7 - hexachloro - 2 - norbornen-5-yl-methyl acetoacetate.

4. 1,2,3,4,7,7 - hexabromo - 2 - norbornen-5-yl-methyl levulinate.

5. 1,2,3,4,7,7 - hexachloro - 2 - norbornen-5-yl-methyl 4-ketohexanoate.
6. 1,2,3,4,7,7 - hexachloro - 2 - norbornen-5,6-yl-bis-(methyl levulinate).
7. α,α - (1,2,3,4,7,7-hexachloro-2-norbornen-5,6-yl)bis-(ethyl levulinate).

References Cited

Chemical Abstracts, 1956, 50:5576c.

LORRAINE A. WEINBERGER, *Primary Examiner.*

V. GARNER, *Assistant Examiner.*

UNITED STATES PATENT OFFICE
CERTIFICATE OF CORRECTION

Patent No. 3,392,190                                            July 9, 1968

Israel J. Dissen

It is certified that error appears in the above identified patent and that said Letters Patent are hereby corrected as shown below:

Column 1, lines 39 and 40, cancel "prepare new compositions of matter useful in the production of products of vinyl resins." and insert -- halogenated bycyclic keto acid-esters useful as plasticizers, especially as plasticizers for vinyl resins. --; lines 43 to 48, the right-hand portion of the formula should appear as shown below:

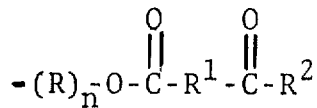

Column 3, line 2, "3-hexenediol-2,5-dimethyl-3-hexenediol-2,5" should read -- 3-hexenediol-2,5,2,5-dimethyl-3-hexenediol-2,5 --; line 47, "ester" should read -- ether --. Column 4, line 8, "bornen-2,6-yl" should read -- bornen-5,6-yl --. Column 6, lines 47 to 53, the right-hand portion of the formula should appear as shown below:

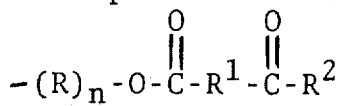

same column 6, line 57, after "fluorine;" insert -- n is an integer from 0 to 1; --.

Signed and sealed this 30th day of December 1969.

(SEAL)
Attest:

EDWARD M. FLETCHER, JR.                      WILLIAM E. SCHUYLER, JR.
Attesting Officer                                   Commissioner of Patents